UNITED STATES PATENT OFFICE.

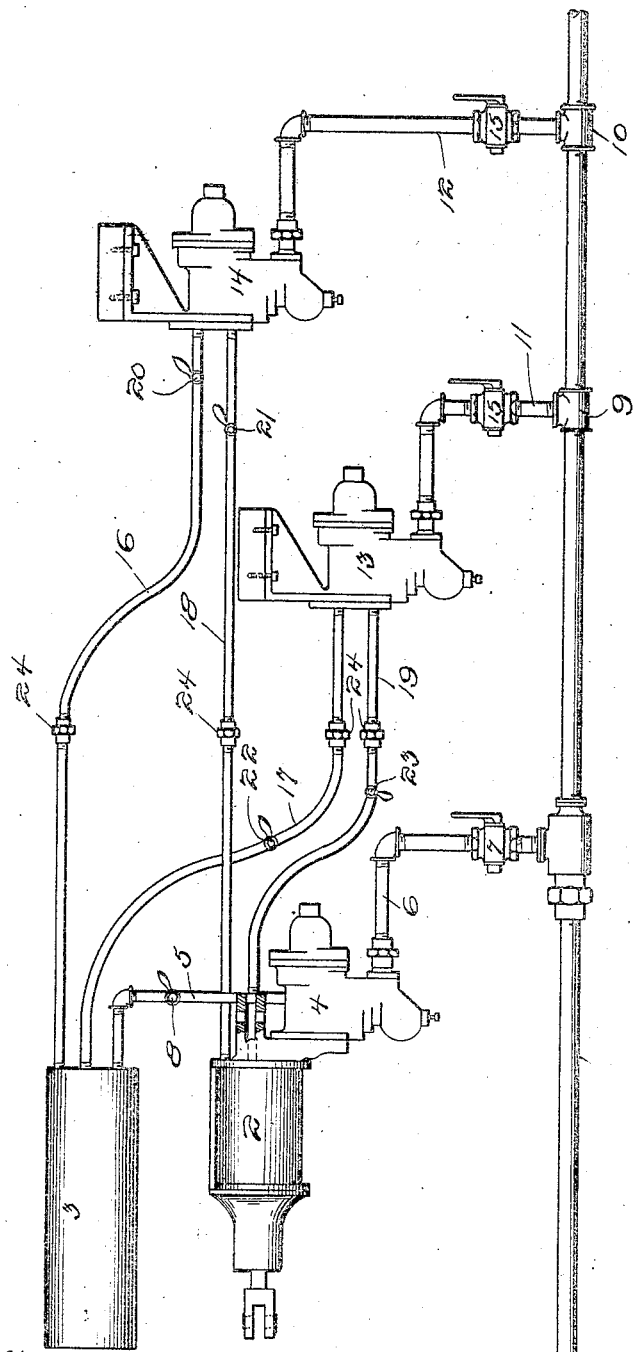

JOHN W. HICKS, OF GOLDSBORO, NORTH CAROLINA.

AIR-BRAKE SYSTEM.

940,314.

Specification of Letters Patent. Patented Nov. 16, 1909.

Application filed April 14, 1909. Serial No. 489,854.

*To all whom it may concern:*

Be it known that I, JOHN W. HICKS, a citizen of the United States, residing at Goldsboro, in the county of Wayne and State of North Carolina, have invented certain new and useful Improvements in Air-Brake Systems, of which the following is a specification, reference being had therein to the accompanying drawing.

This invention relates to air brake systems, and has specially in view an attachment therefor by means of which the auxiliary reservoir may be charged and recharged in a rapid manner so as to permit of many and frequent applications of the brakes without danger of the supply from said auxiliary reservoir being exhausted.

In carrying out the objects of the invention generally stated above it is contemplated employing the usual brake cylinder, train pipe, and auxiliary reservoir, but said train pipe is tapped for connection with two or more feed pipes each of which is provided with a triple valve which has a pipe connection with said brake cylinder and said reservoir, said connections being provided with plugs or valves by means of which any of the same may be cut-out when desired or necessary. The described connections between the train pipe and the brake cylinder and auxiliary reservoir being such that the pressure may be fed thereto from two or more separate and independent sources, thereby greatly quickening the charging and re-charging of the auxiliary reservoir and also the setting of the brakes and the release of the same. In this connection it might be stated that the invention is particularly valuable for mountainous roads where there is frequent necessity for the application of the brakes in such a rapid manner and the applications being at such close intervals that there is grave danger of the reservoir being exhausted and the necessity of another application of the brakes before the ordinary feed pipe can replenish the exhausted reservoir. It is the aim of the present invention, therefore, to adapt the ordinary air brake system to meet such emergencies as the above, and others, wherein it may be necessary for the brakes to be applied at frequent intervals.

To produce an invention capable of practically performing the above stated functions it will, of course, be readily understood that the essential features thereof are susceptible of a wide range of details and structural arrangements, but one preferred and practical embodiment of the same is shown in the accompanying drawings, wherein the preferred embodiment of the invention is shown in diagram as it would appear when looking at the bottom of a car.

Referring to said drawings it will be observed that no special change is proposed in the general arrangement of the usual train pipe 1, brake cylinder 2 and auxiliary reservoir 3, and as is usual, the brake cylinder 2 has suitably secured to one end thereof a triple valve casing 4 which has a pipe communication 5 with the auxiliary reservoir 3 at its upper end and another pipe connection 6 with the train pipe 1 at its lower end or base, said pipes 5 and 6 being each provided with a manually operable valve or plug 7 and 8, respectively, by means of which they may be cut-out when desirable or necessary. Said train pipe 1 at points suitably spaced from the connection with the pipe 6, is provided with angular couplings 9 and 10 each being provided with feed pipes 11 and 12 which communicate with triple valve casings 13 and 14, said pipes being provided with manually operable valves or plugs 15 which control the passage of air through the same. Said valve casings 13 and 14 each have an independent pipe communication 16 and 17 with the auxiliary reservoir 3, and also with the brake cylinder 2, as indicated at 18 and 19. And each pipe 16, 17, 18, and 19 is provided with a manually operable valve or plug, 20, 21, 22 and 23, respectively, through the medium of which the same may be cut off from communication with the brake cylinder and the auxiliary reservoir.

The valves which control the ports of the casings are of the well known standard type, as well as said casings, therefore it has not been thought necessary to describe the same in detail, nor fully illustrate the same.

Briefly stated, the operation of the improved quick acting attachment is as follows:—The air flows through the pipe 1 and is taken therefrom through the pipe connections 6, 11 and 12, and through the valve casings and from the latter to the auxiliary reservoir 1 by means of the pipes 5, 16 and 17, the usual piston valve of said casings permitting such flow of air, but preventing the same from entering the brake cylinder. When necessary to apply the brakes, the air may be drawn from the reservoir through said pipes 5, 16 and 17, through the valve casings to and through the pipe connections 18 and 19 and the usual port connection between casing 5, to the brake cylinder. It will be seen that this arrangement permits of the air being delivered from the auxiliary reservoir through a plurality of independent sources, thereby greatly quickening the application of the brakes, the advantage of which will be apparent. And it will also be seen that through the medium of said plurality of independent sources of air supply, the release of the brakes may be quickly effected. Another prominent and distinctive feature of the invention is the provision of the valves by means of which the connection between each valve casing and the train pipe and the reservoir and brake cylinder may be cut out, when desired or necessary, which permits the brakes to be operated with but one triple valve, or with two, thus obviating the necessity of the car being removed from the train should one of the connections become defective.

As will be observed by reference to the drawings, the pipe communications between the valve casings and the feed pipe, brake cylinder and auxiliary reservoir are preferably in two or more lengths and are provided with couplings 24 whereby the same may be readily separated for repair, replacement, &c.

While in the foregoing description and in the accompanying drawing, the invention has been shown and described as provided with three triple valves each having independent connections with the train pipe, brake cylinder and auxiliary reservoir, it will be understood of course that the same may be varied in number, that is to say, the improved air brake system may be equipped with but two triple valves and independent connections, or if desirable, it may contain more than three.

What I claim as my invention is:—

1. An air brake system comprising a train pipe, auxiliary reservoir, brake cylinder, and a plurality of triple valves each having an independent communication with said train pipe, reservoir and cylinder.

2. An air brake system comprising a train pipe, auxiliary reservoir, brake cylinder, a plurality of triple valves, and an independent valve controlled communication between each triple valve and said pipe, reservoir and cylinder.

3. An air brake system comprising a train pipe, auxiliary reservoir, brake cylinder, independent triple valves, a separate pipe connection between each valve and the train pipe, a separate pipe connection between said valves and the reservoir, and a separate pipe connection between said valves and the brake cylinder.

4. An air brake system comprising a source of pressure supply, an auxiliary reservoir, a brake cylinder, and independent connections between the source of pressure supply and the reservoir and between the reservoir and the cylinder.

5. An air brake system comprising a train pipe, a plurality of feed pipes arranged in spaced relation thereon, a triple valve carried by each feed pipe, an auxiliary reservoir, a pipe connection between each triple valve and said reservoir, a braking cylinder, and an independent pipe connection between each triple valve and the braking cylinder.

6. An air brake system comprising a train pipe, an auxiliary reservoir, a brake cylinder, independent connections between said pipe and said reservoir, and between said reservoir and said cylinder, and manually operable valves carried by said connections whereby the same may be independently controlled.

7. In an air brake system, the combination with a train pipe, an auxiliary reservoir and air brake cylinders, of a plurality of independent connections between said pipe and opening into one end of said reservoir and between said reservoir and said cylinders, and said connections provided with transversely-alined manually-operated valves, whereby the operator can quickly control the passage of compressed air through one or all of the connections without moving along either one of the connections, substantially as disclosed.

In testimony whereof I hereunto affix my signature in presence of two witnesses.

JOHN W. HICKS.

Witnesses:
W. C. LANE,
W. K. LANE.